US012695528B2

(12) United States Patent
Lee

(10) Patent No.: US 12,695,528 B2
(45) Date of Patent: Jul. 28, 2026

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Songeun Lee, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 613 days.

(21) Appl. No.: 18/114,627

(22) Filed: Feb. 27, 2023

(65) Prior Publication Data

US 2023/0318727 A1 Oct. 5, 2023

(30) Foreign Application Priority Data

Mar. 29, 2022 (KR) ........................ 10-2022-0039130

(51) Int. Cl.
| | |
|---|---|
| *H04H 20/57* | (2008.01) |
| *G10L 15/08* | (2006.01) |
| *G10L 15/18* | (2013.01) |
| *G10L 15/22* | (2006.01) |
| *H04H 20/71* | (2008.01) |

(52) U.S. Cl.
CPC ......... *H04H 20/57* (2013.01); *G10L 15/1815* (2013.01); *G10L 15/22* (2013.01); *H04H 20/71* (2013.01); *G10L 2015/088* (2013.01); *G10L 2015/223* (2013.01)

(58) Field of Classification Search
CPC .... H04H 20/57; H04H 20/71; G10L 15/1815; G10L 15/22; G10L 2015/088; G10L 2015/223; H04N 2007/17381
See application file for complete search history.

(56) References Cited

U.S. PATENT DOCUMENTS

| | | | | |
|---|---|---|---|---|
| 5,761,606 A * | 6/1998 | Wolzien | ................. | H04H 60/68 |
| | | | | 348/460 |
| 6,181,260 B1 * | 1/2001 | Simon | ..................... | G01W 1/10 |
| | | | | 455/431 |
| 6,389,055 B1 * | 5/2002 | August | .............. | H04N 21/4784 |
| | | | | 348/E7.054 |
| 7,096,225 B2 * | 8/2006 | Otsuki | ................... | G01C 21/34 |
| | | | | 707/999.1 |
| 7,133,837 B1 * | 11/2006 | Barnes, Jr. | ......... | G06Q 30/0635 |
| | | | | 705/26.81 |

(Continued)

*Primary Examiner* — Lewis G West
(74) *Attorney, Agent, or Firm* — Lempia Summerfield Katz LLC

(57) ABSTRACT

Provided are a vehicle and a method of controlling the same that are capable of, when a user having been listening to a radio broadcast in a vehicle desires to send a message to the radio broadcast, providing a service that conveniently and safely sends the message to the radio broadcast when the user utters the message as speech. The vehicle may, based on a predetermined condition being satisfied while the audio corresponding to the radio broadcast signal is being output through a speaker, generate a message signal based on a speech message of the user input into a microphone, and control a communication module to transmit the generated message signal to a broadcasting station that broadcasts the radio broadcast signal.

18 Claims, 12 Drawing Sheets

(56) References Cited

U.S. PATENT DOCUMENTS

| | | | | |
|---|---|---|---|---|
| 7,274,905 B1* | 9/2007 | Nguyen | | H04H 40/90 |
| | | | | 455/66.1 |
| 8,600,732 B2* | 12/2013 | Kore | | G10L 15/26 |
| | | | | 704/8 |
| 8,606,568 B1* | 12/2013 | Tickner | | G10L 15/22 |
| | | | | 704/251 |
| 8,615,157 B1* | 12/2013 | Isaacson | | H04N 21/41422 |
| | | | | 725/50 |
| 8,738,383 B2* | 5/2014 | Schuck | | G16H 40/67 |
| | | | | 704/275 |
| 9,128,981 B1* | 9/2015 | Geer | | G06F 16/444 |
| RE46,528 E * | 8/2017 | Miloslavsky | | H04M 3/5191 |
| 9,858,595 B2* | 1/2018 | Barnes, Jr. | | G06F 40/169 |
| 11,942,083 B2* | 3/2024 | Melendo Casado | | G10L 25/84 |
| 2002/0049037 A1* | 4/2002 | Christensen | | G06Q 30/0277 |
| | | | | 348/E7.071 |
| 2003/0212996 A1* | 11/2003 | Wolzien | | G01C 21/3679 |
| | | | | 348/E7.071 |
| 2005/0120858 A1* | 6/2005 | Fitzgerald | | H04N 21/8352 |
| | | | | 348/E7.071 |
| 2008/0103779 A1* | 5/2008 | Huang | | G10L 15/28 |
| | | | | 704/275 |
| 2008/0134264 A1* | 6/2008 | Narendra | | H04N 21/8106 |
| | | | | 725/110 |
| 2009/0281897 A1* | 11/2009 | Antos | | H04N 7/17318 |
| | | | | 705/14.54 |
| 2010/0030738 A1* | 2/2010 | Geer | | G06F 16/489 |
| | | | | 707/E17.108 |
| 2010/0138861 A1* | 6/2010 | Hong | | H04H 60/22 |
| | | | | 725/39 |
| 2012/0116748 A1* | 5/2012 | Kore | | G10L 15/26 |
| | | | | 704/2 |
| 2012/0173238 A1* | 7/2012 | Mickelsen | | G10L 15/30 |
| | | | | 704/E15.001 |
| 2012/0283894 A1* | 11/2012 | Naboulsi | | A61B 5/18 |
| | | | | 701/1 |
| 2013/0034147 A1* | 2/2013 | Ballout | | H04H 20/02 |
| | | | | 375/E7.026 |
| 2013/0040600 A1* | 2/2013 | Reitnour | | H04M 1/72424 |
| | | | | 455/418 |
| 2013/0066667 A1* | 3/2013 | Gulec | | G06Q 10/06 |
| | | | | 705/7.13 |
| 2013/0282532 A1* | 10/2013 | Shihadah | | G06Q 30/00 |
| | | | | 705/27.1 |
| 2014/0272821 A1* | 9/2014 | Pitschel | | G06F 40/58 |
| | | | | 434/157 |
| 2014/0337733 A1* | 11/2014 | Rodriguez | | H04M 1/72469 |
| | | | | 715/718 |
| 2015/0235637 A1* | 8/2015 | Casado | | G10L 21/034 |
| | | | | 704/235 |
| 2018/0060262 A1* | 3/2018 | Kim | | G06F 13/4022 |
| 2021/0120055 A1* | 4/2021 | Moriguchi | | H04L 12/18 |
| 2022/0035596 A1* | 2/2022 | Hu | | G06F 40/40 |
| 2022/0044691 A1* | 2/2022 | Omura | | G10L 25/81 |
| 2023/0260403 A1* | 8/2023 | Rajanna | | G08G 1/166 |
| | | | | 701/301 |

* cited by examiner

FIG. 3

VEHICLE AND METHOD OF CONTROLLING THE SAME

CROSS-REFERENCE TO RELATED APPLICATION

This application claims the benefit of and priority to Korean Patent Application No. 10-2022-0039130, filed on Mar. 29, 2022, the entire contents of which are incorporated herein by reference.

TECHNICAL FIELD

The present disclosure relates to a vehicle capable of recognizing a speech command of a user and a method of controlling the same.

BACKGROUND

A speech recognition system is a system that identifies an intent of a user by recognizing a user's speech and provides a service corresponding to the identified intent of the user.

The speech recognition system may, in association with a specific device, perform control of the device according to an intent of a user, or provide specific information according to the intent of the user.

Recently, such speech recognition systems have been provided in vehicles, so that a user may receive a desired service simply by uttering his or her speech.

SUMMARY

The present disclosure may provide a vehicle and a method of controlling the same that are capable of, when a user having been listening to a radio broadcast in a vehicle desires to send a message to the radio broadcast, providing a service that conveniently and safely sends the message to the radio broadcast when the user utters the message as speech.

The technical objectives of the disclosure are not limited to the above, and other objectives may become apparent to those of ordinary skill in the art based on the following descriptions.

According to an embodiment of the present disclosure, a vehicle includes: a microphone; a display; a communication module; a radio reception module configured to receive a radio broadcast signal; a speaker configured to output audio corresponding to the received radio broadcast signal; and a controller configured to, based on a predetermined condition being satisfied while the audio corresponding to the radio broadcast signal is being output through the speaker, generate a message signal based on a speech message of a user input into the microphone, and control the communication module to transmit the generated message signal to a broadcasting station that broadcasts the radio broadcast signal.

In an aspect, the predetermined condition may be satisfied when an intent corresponding to a speech command of the user input into the microphone includes message sending.

In an aspect, the microphone may receive the audio output through the speaker, and the predetermined condition may be satisfied when the audio input into the microphone includes a keyword related to message sending.

In an aspect, the vehicle may further include: a camera; and a global positioning system (GPS) module, wherein the controller may be configured to control the communication module to transmit at least one of an image captured by the camera or location information obtained by the GPS module together with the message signal.

In an aspect, the controller may be configured to, when the speech message of the user includes a keyword related to a current location, control the communication module to transmit the location information obtained by the GPS module together with the message signal.

In an aspect, the controller may be configured to generate the message signal based on text converted from the speech message of the user input into the microphone.

In an aspect, the controller may be configured to, when the text includes a keyword related to a current location, replace the keyword related to the current location with the location information obtained by the GPS module to generate the message signal.

In an aspect, the controller may be configured to, when the speech message of the user includes a predetermined keyword, control the communication module to transmit the image acquired by the camera together with the message signal.

In an aspect, the microphone may be configured to receive the audio output through the speaker, and the controller may be configured to recognize a recipient number for message sending in the audio input into the microphone, and control the communication module to transmit the message signal to the recognized recipient number.

In an aspect, the controller may be configured to, when the user is logged in to a website corresponding to the radio broadcast signal, control the communication module for the message signal to be transmitted through the website.

According to another embodiment of the present disclosure, a method of controlling a vehicle includes: receiving a radio broadcast signal; outputting audio corresponding to the received radio broadcast signal through a speaker; upon a predetermined condition being satisfied while the audio corresponding to the radio broadcast signal is being output, generating a message signal based on a speech message of a user input into a microphone; and transmitting the generated message signal to a broadcasting station that broadcasts the radio broadcast signal.

In an aspect, the predetermined condition may be satisfied when an intent corresponding to a speech command of the user input into the microphone includes message sending.

In an aspect, the audio corresponding to the radio broadcast signal output through the speaker may be input into the microphone, and the predetermined condition may be satisfied when the audio input into the microphone includes a keyword related to message sending.

In an aspect, transmitting the generated message signal may include transmitting at least one of an image captured by a camera or location information obtained by a global positioning system (GPS) module together with the message signal.

In an aspect, transmitting the generated message signal may include, when the speech message of the user includes a keyword related to a current location, transmitting the location information obtained by the GPS module together with the message signal.

In an aspect, generating the message signal may include generating the message signal based on text converted from the speech message of the user input into the microphone.

In an aspect, generating the message signal may include, when the text includes a keyword related to a current location, replacing the keyword related to the current location with the location information obtained by the GPS module to generate the message signal.

In an aspect, transmitting the generated message signal may include, when the speech message of the user includes a predetermined keyword, transmitting the image acquired by the camera together with the message signal.

In an aspect, transmitting the generated message signal may include, when the microphone receives the audio corresponding to the radio broadcast signal output through the speaker, recognizing a recipient number for message sending in the audio input into the microphone, and transmitting the message signal to the recipient number.

In an aspect, transmitting the generated message signal may include, when the user is logged in to a website corresponding to the radio broadcast signal, transmitting the message signal through the website.

BRIEF DESCRIPTION OF THE DRAWINGS

These and/or other aspects of the disclosure should become apparent and more readily appreciated from the following detailed description taken in conjunction with the accompanying drawings, in which:

FIG. 3 is a diagram schematically illustrating a relationship between a vehicle and a speech recognition apparatus, according to an embodiment;

DETAILED DESCRIPTION

Figure 1:
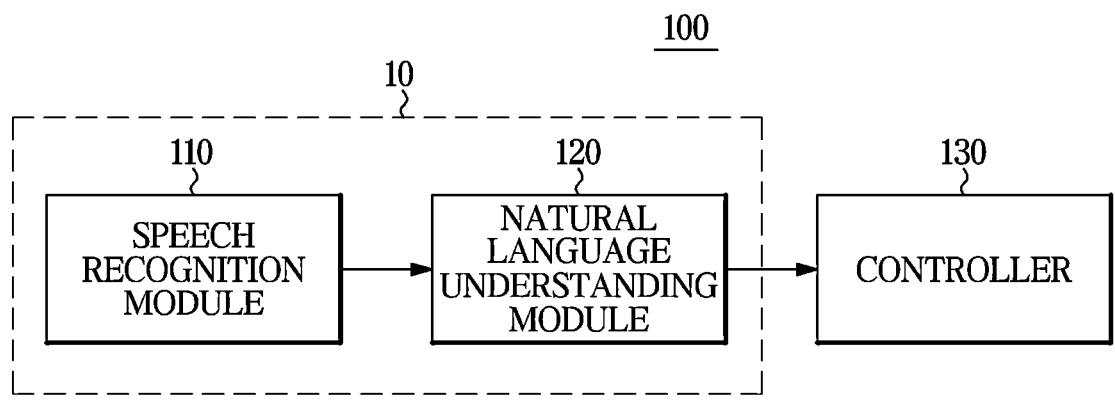
FIG. 1 is a block diagram illustrating a speech recognition apparatus connected to a vehicle, according to an embodiment.

Embodiments described in the specification and configurations shown in the accompanying drawings are merely examples, and various modifications, additions and substitutions are possible, without departing from the scope and spirit of the disclosure.

Further, identical symbols or numbers in the accompanying drawings denote components or elements configured to perform substantially identical functions.

Further, terms used herein are only for the purpose of describing particular embodiments and are not intended to limit the present disclosure.

The singular form is intended to include the plural form as well, unless the context clearly indicates otherwise.

It should be further understood that the terms "include," "including," "have," and/or "having" specify the presence of stated features, operations, elements, components, and/or groups thereof, but do not preclude the presence or addition of one or more other features, operations, elements, components, and/or groups thereof.

Further, it should be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope of the present disclosure.

The term "and/or" includes combinations of one or all of a plurality of associated listed items.

The terms, such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories, or processors.

Reference numerals used for method operations are just used for convenience of explanation, but not to limit an order of the operations. Thus, unless the context clearly dictates otherwise, the written order may be practiced otherwise.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

When a component, device, element, or the like of the present disclosure is described as having a purpose or performing an operation, function, or the like, the component, device, or element should be considered herein as being "configured to" meet that purpose or perform that operation or function.

Hereinafter, embodiments of a vehicle, a speech recognition apparatus connected to the vehicle, and a method of controlling a vehicle according to an aspect are described in detail with reference to the accompanying drawings.

FIG. 1 is a block diagram illustrating a speech recognition apparatus 100 connected to a vehicle, according to an embodiment.

The speech recognition apparatus 100 connected to the vehicle may be an apparatus capable of processing a speech command input to the vehicle, and may be an apparatus embedded in the vehicle, or provided in a separate speech recognition server and connected to the vehicle via a wireless communication network.

The speech recognition apparatus 100 may include a speech processing module 10 that may be configured to extract information required to perform control intended by a user. The speech recognition apparatus 100 may also include a controller 130 that may be configured to generate a control signal for performing control intended by the user.

The speech processing module 10 may include a speech recognition module 110 that may be configured to convert a speech command of a user into text. The speech processing module 10 may also include a natural language understanding module 120 configured to determine an intent corresponding to the text.

The speech recognition module 110 may be implemented as a speech to text (STT) engine and may apply a speech recognition algorithm to an utterance of a user to convert the utterance into text.

For example, the speech recognition module 110 may use feature vector extraction technologies, such as Cepstrum, Linear Predictive Coefficient (LPC), Mel Frequency Cepstral Coefficient (MFCC) or Filter Bank Energy, to extract a feature vector from an utterance of a user.

The extracted feature vector may be compared with a trained reference pattern to obtain a recognition result. For example, an acoustic model that models and compares signal characteristics of a speech or a language model that models a linguistic order relationship of words or syllables corresponding to a recognized vocabulary may be used.

In an example, the speech recognition module 110 may convert a speech signal into text using machine learning or deep learning technology. It should be understood that the above-described methods of converting a speech signal into text by the speech recognition module 110 are not limiting, and the speech recognition module 110 may convert a speech signal into text by employing various speech recognition technologies in addition to, or instead of, the above-described methods, in various embodiments.

The natural language understanding module 120 may employ natural language understanding (NLU) technology to determine an intent of a user contained in text. Accordingly, the natural language understanding module 120 may include a NLU engine for determining an intent of a user by applying NLU technology to an input sentence. The text output by the speech recognition module 110 may refer to an input sentence that is input into the natural language understanding module 120.

For example, the natural language understanding module 120 may recognize an entity name from an input sentence. An entity name may be a proper noun, such as a person's name, a place name, an organization name, a time, a date, money, etc., and the named entity recognition (NER) may be a task of identifying an entity name in a sentence and determining a type of the identified entity name. Using the NER, an important keyword may be extracted from a sentence and the meaning of the sentence may be grasped.

In some examples, the natural language understanding module 120 may determine a domain from the input sentence. The domain may allow the subject of the user's utterance to be identified. For example, domains representing various subjects, such as vehicle control, schedule, information provision of a weather or traffic condition, texting, navigations, etc., may be determined based on the input sentence. It should be understood that the above-described domain is merely an example, and various domains for identifying the subject of a user's utterance may be defined according to design.

In some examples, the natural language understanding module 120 may analyze a speech act of the input sentence. The analysis of a speech act may be a task of analyzing the intent of the utterance. The analysis of a speech act may thus be provided to identify the intent of the utterance, such as whether the user asks a question, makes a request, responds, or expresses a simple sentiment.

In some examples, the natural language understanding module 120 may classify an intent corresponding to an input sentence, and may extract an entity required to perform the corresponding intent.

For example, when the input sentence is "Send a text message", the domain may be [texting], the intent may be [send, text], in which [send] is an action, and [text] is a target, and the entity required to perform control corresponding to the intent may be [content, recipient].

It should be understood that the terms and definitions thereof may be used differently in various speech recognition apparatuses. Accordingly, even when differently termed, terms having the same or similar role in the natural language understanding module may be included in the scope of the present disclosure.

The controller 130 may, in order to provide a service corresponding to the user's intent, process the results of speech recognition and natural language understanding, and output a result processing signal to a user terminal or an external server. For example, the controller 130 may generate a control signal for performing control corresponding to an intent extracted from a user's speech command and output the control signal.

The user terminal may serve as a gateway for connecting the user to the speech recognition apparatus 100. For example, the user terminal may be a mobile device having an input/output interface, such as a microphone, a speaker, and a display, or may be a vehicle itself. When the user terminal is a mobile device, the vehicle and the mobile device may be interconnected through wireless communication, such as Bluetooth, or a cable connection.

For example, when the service corresponding to the user's intent is vehicle-related control, the controller 130 may generate a control signal for performing the corresponding control and transmit the generated control signal to the user terminal.

Alternatively, when the service corresponding to the user's intent is provision of specific information, the controller 130 may retrieve the corresponding information and deliver the retrieved information to the user terminal. As needed, such retrieval of information may be performed by another external server.

Alternatively, when the service corresponding to the user's intent is provision of specific content, the controller 130 may request the content from an external server that provides the corresponding content.

Alternatively, when the service corresponding to the user's intent is continuation of a simple dialogue, the controller 130 may generate a response to a user's utterance and output the response as speech.

The speech recognition apparatus 100 described above may be implemented by at least one memory in which a program for performing the above-described operations is stored and at least one processor for executing the stored program.

The components of the speech recognition apparatus 100 shown in FIG. 1 are divided based on the operations or functions thereof, and all or part of the components may share a memory or a processor. Accordingly, the speech recognition module 110, the natural language understanding module 120, and the controller 130 do not necessarily refer to physically separate components.

Figure 2:
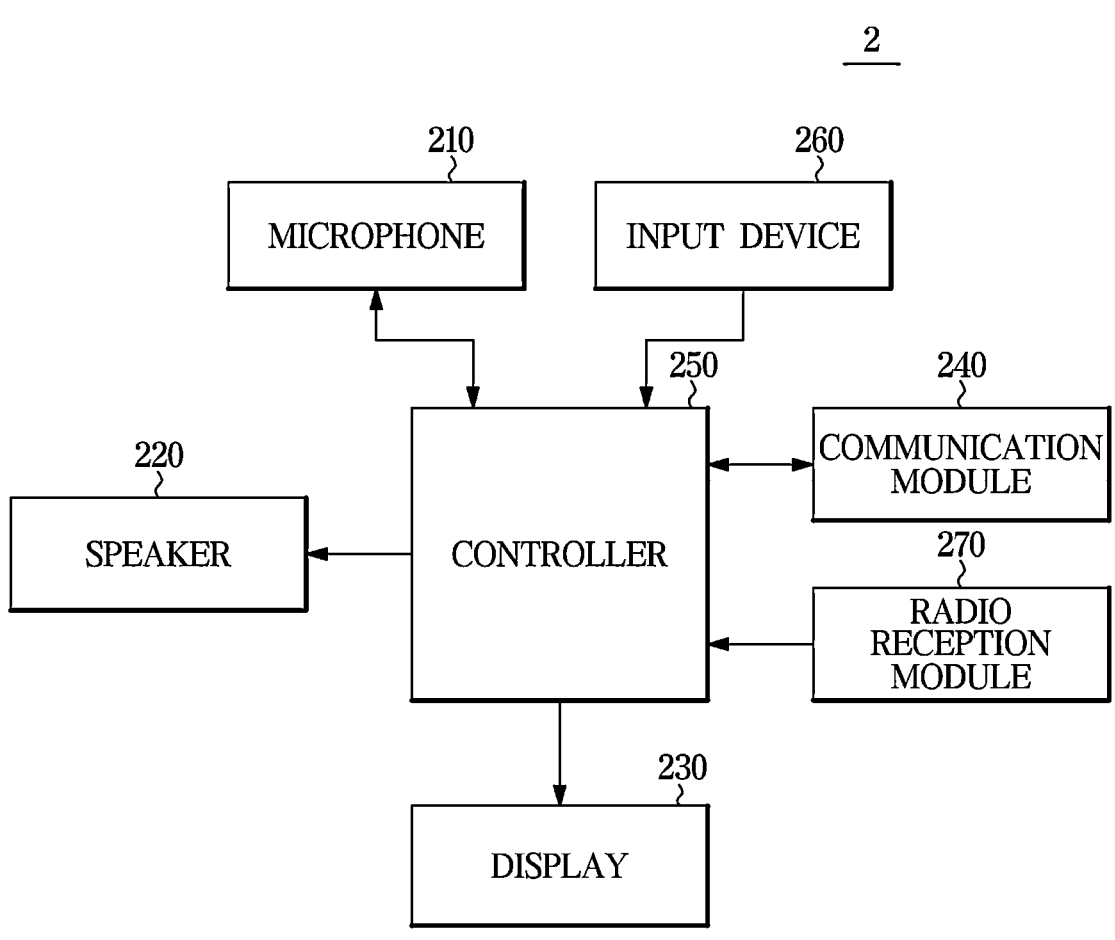
FIG. 2 is a block diagram illustrating a vehicle, according to an embodiment.
Figure 3:
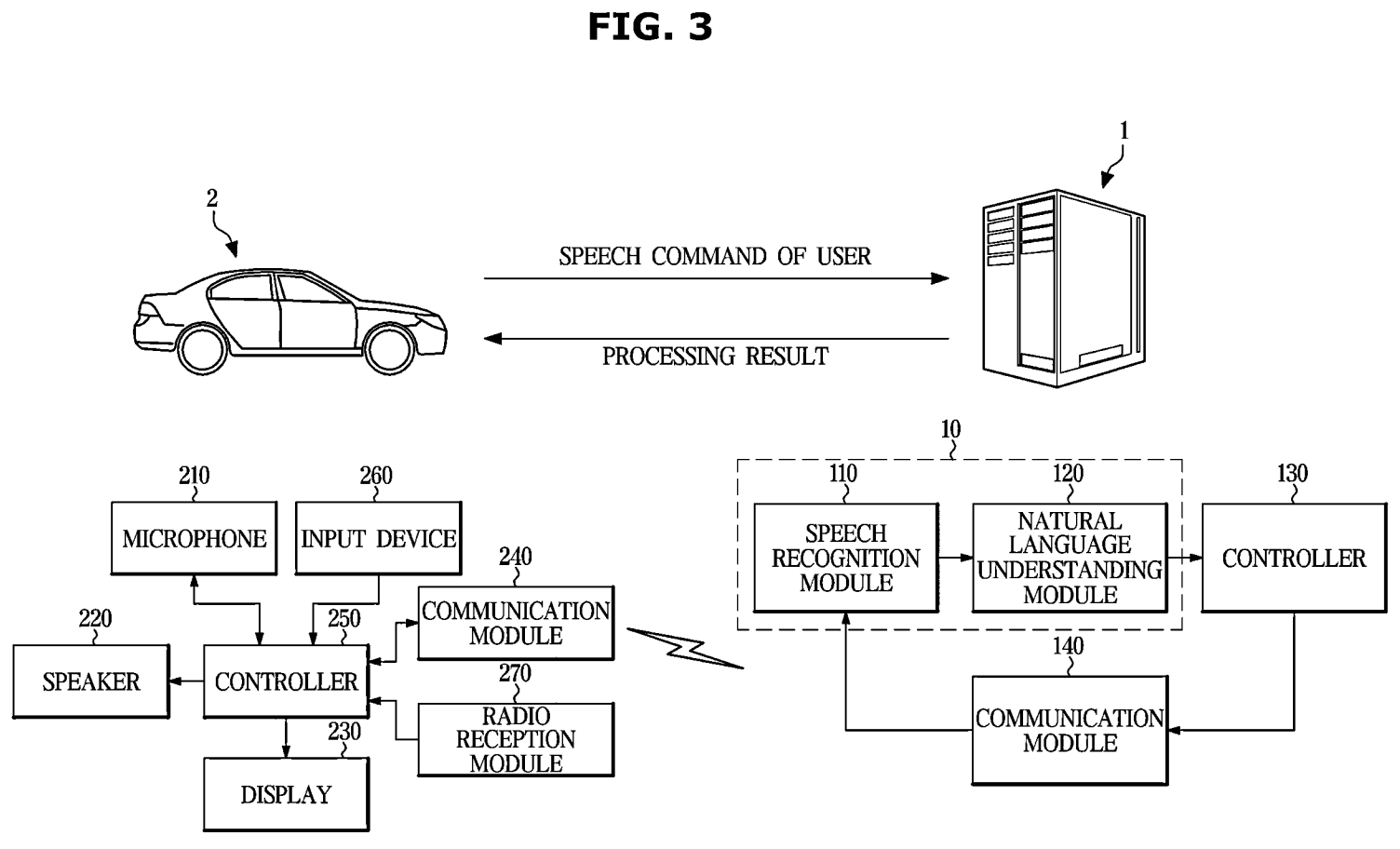

FIG. 2 is a block diagram illustrating a vehicle, according to an embodiment. FIG. 3 is a diagram schematically illustrating a relationship between a vehicle and a speech recognition apparatus, according to an embodiment.

Referring to FIG. 2, a vehicle 2 may include a microphone 210 to which a user's speech is input, a speaker 220 configured to output audio required to provide a service desired by the user, a display 230 configured to display an image required to provide a service desired by the user, a communication module 240 configured to communicate with an external device, a radio reception module 270 configured to receive a radio broadcast signal, and a controller 250 configured to control the above-described components and/or other components of the vehicle 2.

The microphone 210 may be provided at a position inside the vehicle 2 at which a user's speech is receivable. The user inputting a speech into the microphone 210 provided in the vehicle 2 may include at least one of a driver and a passenger.

For example, the microphone 210 may be provided at a position adjacent to a steering wheel, a center fascia, a headlining or a rearview mirror, etc. in order to receive a driver's speech.

In addition to a user's speech, various audios generated in the vicinity of the microphone 210 may be input to the microphone 210. For example, audio output from the speaker 220 may also be input to the microphone 210.

The microphone 210 may output an audio signal corresponding to the input audio, and the output audio signal may be processed by the speech recognition apparatus 100. When the speech recognition apparatus 100 is embedded in the vehicle 2, the audio signal may be input to the speech recognition apparatus 100. When the speech recognition apparatus 100 is provided in an external speech recognition server, the audio signal may be transmitted to the speech recognition server through the communication module 240.

The vehicle 2 may also include an input device 260 for manually receiving a user's command in addition to the microphone 220. The input device 260 may include an input device provided in the form of a button, a touch pad, or a jog shuttle in an area in which an audio-video navigation (AVN) system of the center fascia is provided, an area in which a gear box is provided, or a steering wheel.

In some examples, in order to enable reception of a control command regarding the passenger seat, the vehicle 2 may include an input device provided on the door of each seat, or may include an input device provided on an armrest of a front seat or an armrest of a rear seat.

In some examples, the input device 260 may include a touch pad that is provided integrally with the display 230 to implement a touch screen.

The display 230 may include an AVN display provided on the center fascia of the vehicle 2, a cluster display, or a head-up display (HUD). Alternatively, the display 230 may include a rear seat display provided on the back of the head of the front seat so as to be viewed by a passenger in the rear seat. In another example, when the vehicle 2 is a high-occupancy vehicle, the display 230 may include a display mounted on the head lining.

The display 230 may be provided at any location and position as long as it can be viewed by a user riding in the vehicle 2, and there is no limitation on the number or position of the display 230.

The communication module 240 may include a wired communication module that exchanges data with external devices in a wired manner and a wireless communication module that exchanges data with external devices in a wireless manner.

The wired communication module may be configured to exchange data with an external device connected through a USB terminal or an AUX terminal.

The wireless communication module may be configured to wirelessly communicate with a base station or an access point (AP), and to exchange data with external devices through the base station or access point.

For example, the wireless communication module may wirelessly communicate with an AP using Wi-Fi (WiFi™, IEEE 802.11 technology standard), or may communicate with a base station using CDMA, WCDMA, GSM, Long Term Evolution (LTE), 5G, WiBro, etc.

In some examples, the wireless communication module may directly communicate with external devices. For example, the wireless communication module may use Wi-Fi Direct, Bluetooth (Bluetooth™, IEEE 802.15.1 technology standard), and ZigBee (ZigBee™, IEEE 802.15.4 technology standard) to transmit and receive data to and from external devices in a short distance.

For example, the communication module 240 may communicate with a mobile device located inside the vehicle 2 through Bluetooth to receive information (a user's video, a user's speech, contact information, schedule, etc.) acquired by the mobile device or stored in the mobile device, and may communicate with a speech recognition server through Wi-Fi, 4G or 5G communication to deliver a user's speech and receive a signal required to provide a service desired by the user.

In some examples, the vehicle 2 may include a radio reception module 270 configured to receive a radio broadcast signal. A radio broadcasting signal may be a signal broadcasted from a radio broadcasting station, and the radio broadcasting station may broadcast a radio broadcasting signal through a frequency allocated to each radio broadcasting channel.

The radio reception module 270 may include an antenna configured to receive a radio broadcast signal and a signal processing module configured to convert the received radio broadcast signal into a form to be processed by the controller 250. When the radio reception module 270 receives a radio broadcast signal, audio corresponding to the received radio broadcast signal may be output through the speaker 220.

In various examples, the communication module 240 and the radio reception module 270 may use respective antennas, and may also share at least one antenna.

In some examples, the vehicle 2 may include a navigation device for guiding directions, an air conditioning device for adjusting the internal temperature, a window adjusting device for controlling opening/closing of a window, a seat heating device for heating the seat, a seat adjustment device for adjusting the position, height or angle of the seat, and a lighting device for adjusting the illuminance of the interior.

The above-described devices provide convenience functions related to the vehicle 2, and some of the above-described devices may be omitted depending on the vehicle model and options and/or other devices may be further included in addition to the above-described devices. The configuration related to the travelling of the vehicle 2 is a well-known configuration, and thus descriptions thereof is omitted herein.

The controller 250 may turn on/off the microphone 210, process or store audio input to the microphone 210, or transmit the audio to another device through the communication module 240.

In some examples, the controller 250 may be configured to control an image to be displayed on the display 230 and to control audio to be output through the speaker 220.

The vehicle 2 according to an embodiment may allow a user, when the user desires to transmit a message to a radio broadcast during output of the radio broadcast, conveniently and safely send the message to the radio broadcast by uttering the message.

In an example, the controller 250 may be configured to, based on a predetermined condition being satisfied while audio corresponding to the radio broadcast signal is being output through the speaker 220, generate a message signal based on a speech message of the user input into the microphone 210, and control the communication module 240 to transmit the generated message signal to a broadcasting station that broadcasts the radio broadcast signal.

In some examples, the controller 250 may be additionally, or alternatively, configured to perform various controls related to the vehicle 2. For example, according to a user's command input through the microphone 210 or the input device 260, at least one of a navigation device, an air conditioning device, a window control device, a seat heating device, a seat control device, or a lighting device may be controlled.

The controller 250 may include at least one memory in which a program for performing the above-described operations and/or operations described below is stored, and at least one processor for executing the stored program.

In some examples, the components of the vehicle 2 having the controller 250, the display 230, and the input device 260 as main parts may constitute a head unit or an infotainment system. In some examples, when a part or entirety of the speech recognition apparatus 100 is embedded on the vehicle 2, the speech recognition apparatus 100 may also be included in the head unit or the infotainment system.

Embodiments of the vehicle 2 and the method of controlling the same may include a case in which a part of entirety of the speech recognition apparatus 100 is included in the vehicle 2 and a case in which the speech recognition apparatus 100 is at least partially provided in an external server.

Referring now to FIG. 3, in an embodiment, the speech recognition apparatus 100 may be provided in a speech recognition server 1 external to the vehicle. Accordingly, a user's speech command input to the vehicle 2 may be transmitted to a communication module 140 of the speech recognition server 1, and upon a speech signal being processed by the speech recognition apparatus 100 provided in the server 1, the communication module 140 may transmit a result of the processing back to the vehicle 2.

The communication module 140 of the speech recognition server 1 may be configured to transmit and receive signals with other devices by employing at least one of various wireless communication methods, such as 4G, 5G, or Wi-Fi.

As described above, all or part of the components of the speech recognition apparatus 100 may be provided in the vehicle 2. For example, the speech recognition module 110 may be provided in the vehicle 2, and the natural language understanding module 120 and the controller 130 may be provided in the speech recognition server 1.

As another example, the speech recognition module 110 and the controller 130 may be provided in the vehicle 2, and the natural language understanding module 120 may be provided in the speech recognition server 1. Alternatively, the speech recognition module 110 and the natural language understanding module 120 may be provided in the speech recognition server 1, and the controller 130 may be provided in the vehicle 2.

As another example, only a part of the speech recognition module 110 may be provided in the vehicle 2.

As another example, the speech recognition apparatus 100 may be provided in the vehicle 2.

Figure 4:
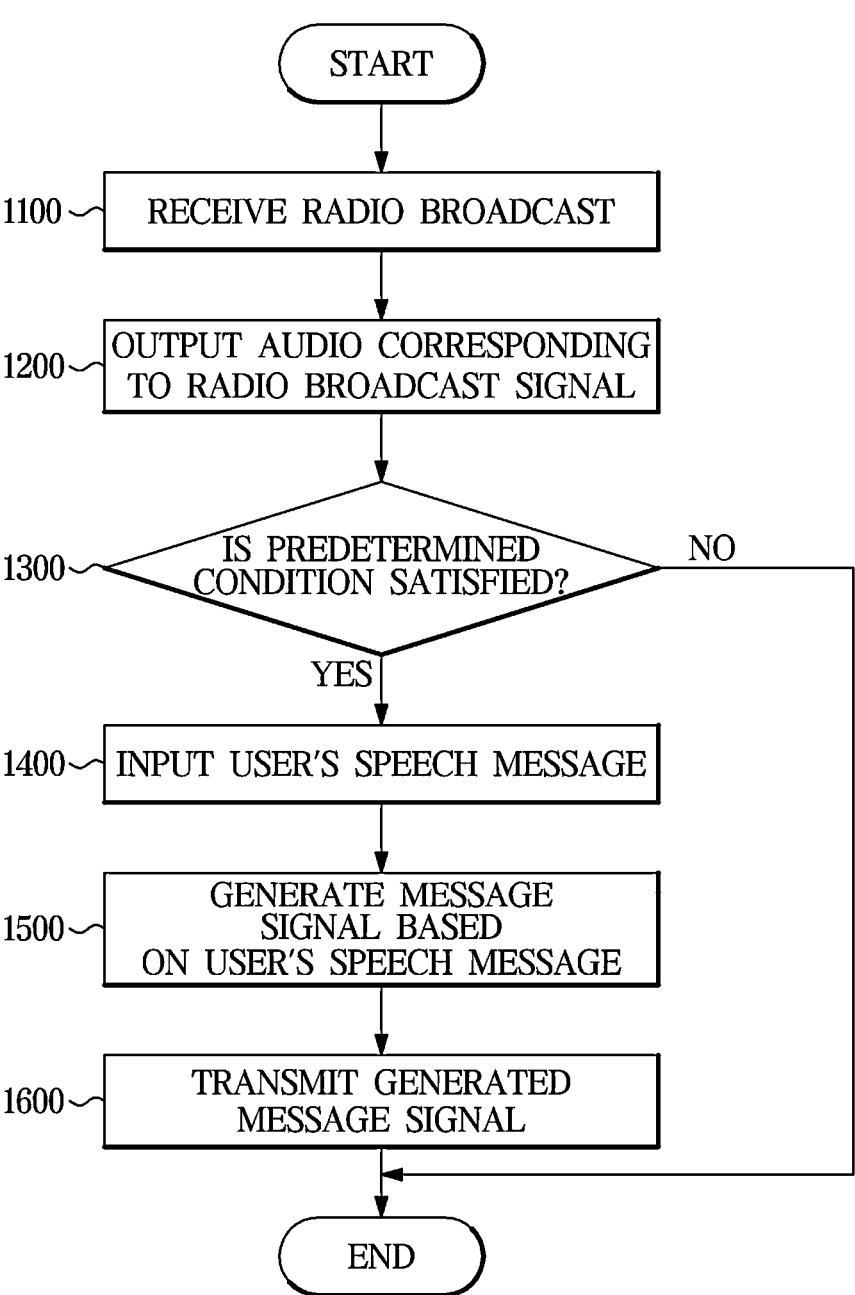
FIG. 4 is a flowchart of a method of controlling a vehicle, according to an embodiment.

FIG. 4 is a flowchart showing a method of controlling a vehicle, according to an embodiment.

In an embodiment, the method of controlling a vehicle as illustrated in FIG. 4 may be implemented to control the vehicle 2. Accordingly, the description of the vehicle 2 may be applied to the method of controlling a vehicle, and the description of the method of controlling a vehicle may also be applied to the vehicle 2.

The flowchart of FIG. 4 is for describing a series of processes in which a radio broadcast is output in the vehicle 2 and a message is transmitted according to a user's intent. All operations shown in FIG. 4 need not be included in the method of controlling a vehicle. Further, all operations shown in FIG. 4 need not be executed by a single agent, and some operations may be performed in the vehicle 2 and some other operations may be performed in the speech recognition server 1.

Referring to FIG. 4, the radio reception module 270 may receive a radio broadcast signal broadcasted from a radio broadcasting station (1100), and may output audio corresponding to the received radio broadcast signal through the speaker 220 (1200). Audio corresponding to a radio broadcast signal is sometimes referred to herein as simply a "radio broadcast".

When a predetermined condition for executing a message sending function is satisfied (YES in operation 1300), a user's speech message may be received through the microphone 210 (1400), and the controller 250 may generate a message signal based on the user's speech message (1500). An operation of the controller 250 generating a message signal, according to an embodiment, is described in more detail below.

The communication module 240 may transmit the generated message signal to a radio broadcasting station (1600).

Various methods, such as a method through sending text to a specific receiving number, a method through a website or application, or the like may be employed as a method for transmitting a message signal to a radio broadcasting station. More detailed descriptions of transmission of a message signal to a radio broadcasting station, according to some embodiments, are provided below.

Figure 5:
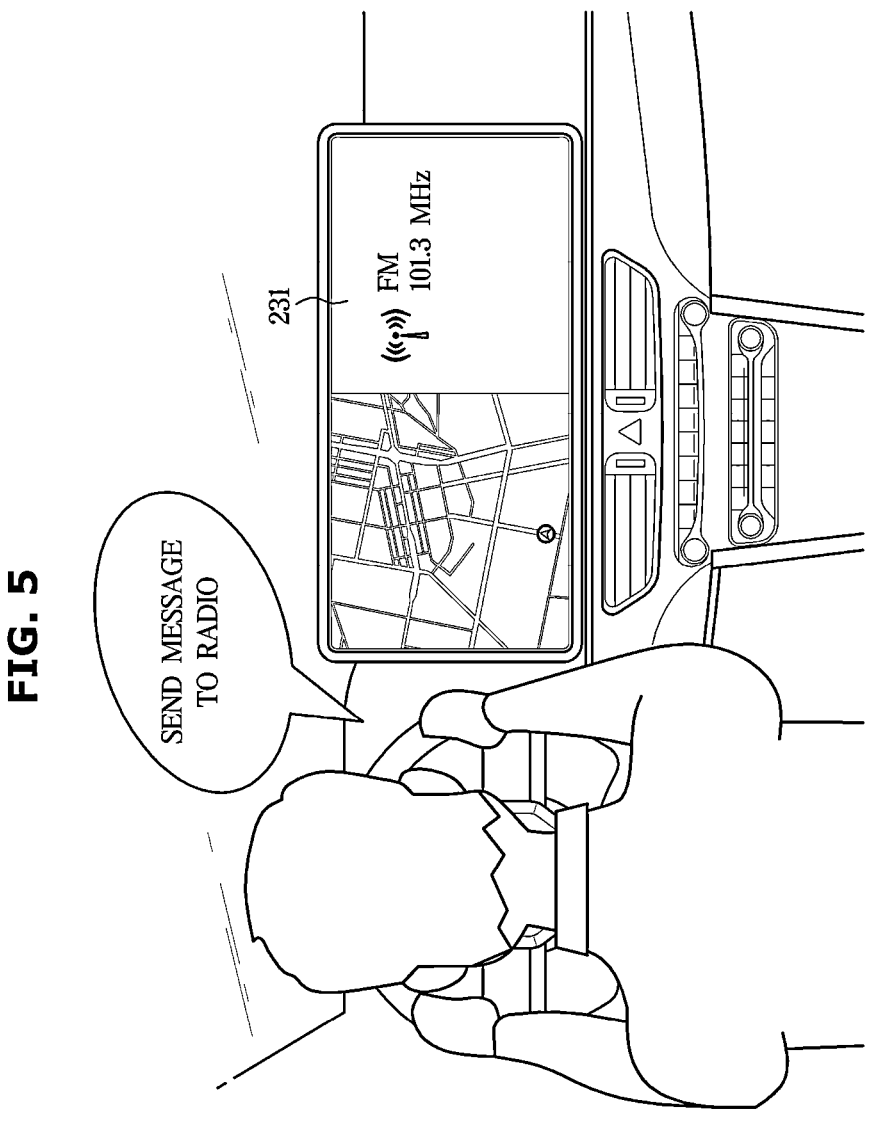
FIG. 5 is a diagram illustrating a situation in which a predetermined condition for executing a message sending function is satisfied in a method of controlling a vehicle, according to an embodiment.

FIG. 5 is a diagram illustrating a situation in which a predetermined condition for executing a message sending function is satisfied in a method of controlling a vehicle, according to an embodiment.

Most radio broadcasts are conducted not only by the presentation of the host and the playback of music but also by the participation of listeners. A listener may participate in a radio broadcast by sending a message to the radio station or making a phone call.

When a user of the vehicle 2 desires to participate in a radio broadcast while the radio broadcast is being output through the speaker 220 of the vehicle 2, the user may utter a speech command, such as "Send a message to the radio" as shown in FIG. 5.

The speech command uttered by the user may be input to the microphone 210, and the speech command input to the microphone 210 may be processed by the speech processing module 10 of the speech recognition apparatus 100.

The speech processing module 10 may determine a user's intent based on the input speech command. When the determined user's intent includes message sending, a predetermined condition may be satisfied. In some examples, the message sending to a radio station may be classified into the same intent as a general texting for exchanging text messages based on a phone number, or may be classified into another intent. This may vary depending on a method of designing a domain or an intent in the speech recognition apparatus 100.

Figure 6:
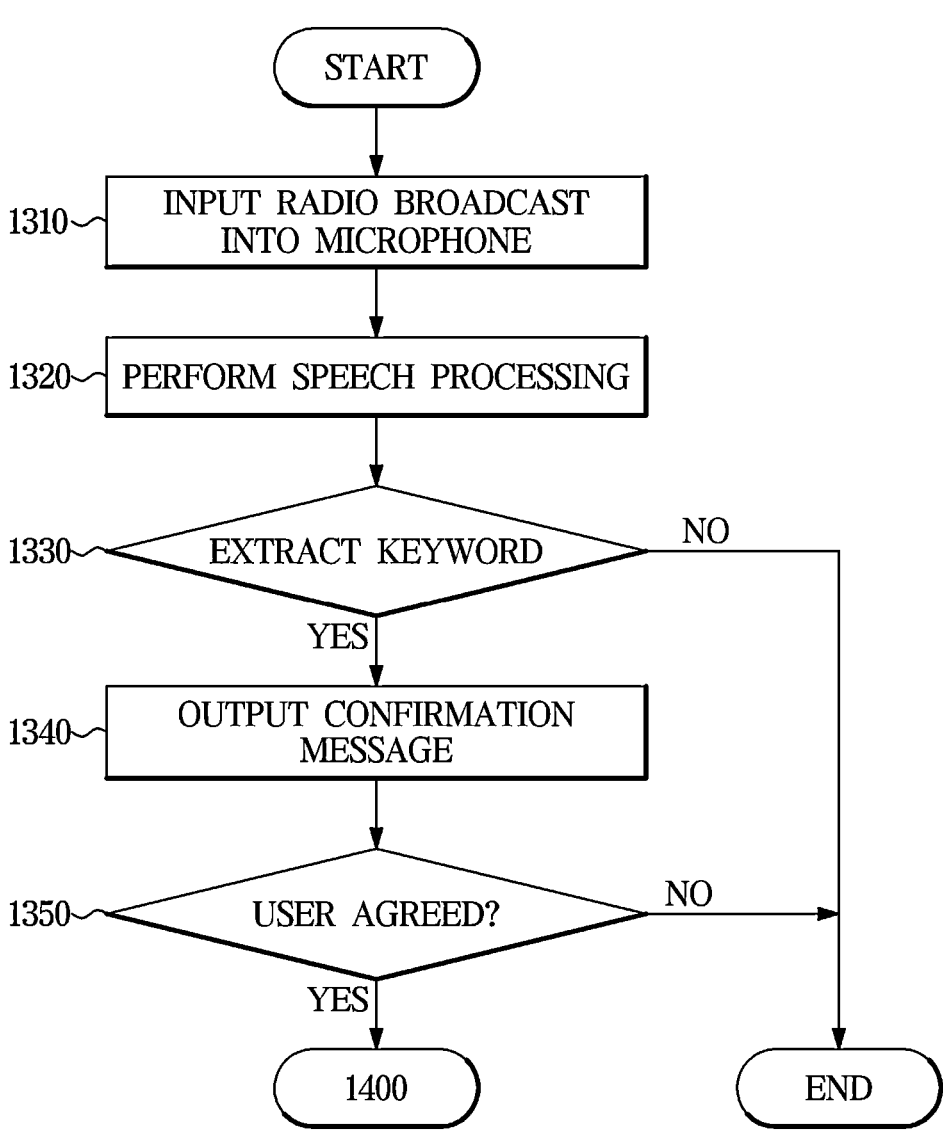
FIG. 6 is a flowchart of another example in which a predetermined condition for executing a message sending function is satisfied in a method for controlling a vehicle, according to another embodiment.
Figure 7:
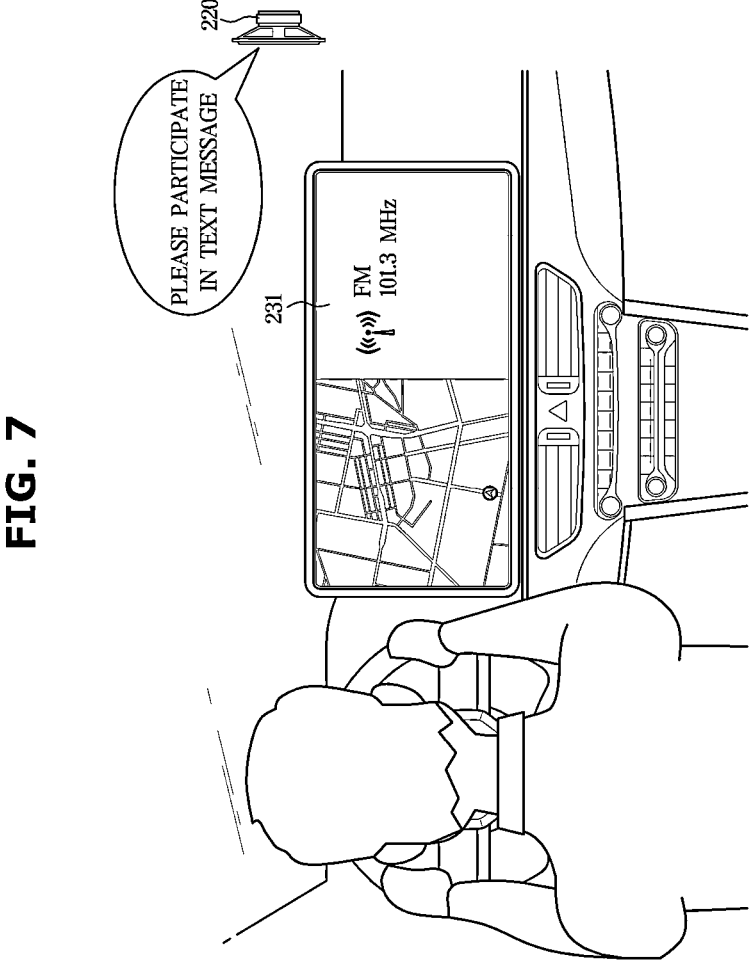
FIGS. 7 and 8 are diagrams illustrating another situation in which a predetermined condition for executing a message sending function is satisfied in a method of controlling a vehicle, according to another embodiment.
Figure 8:
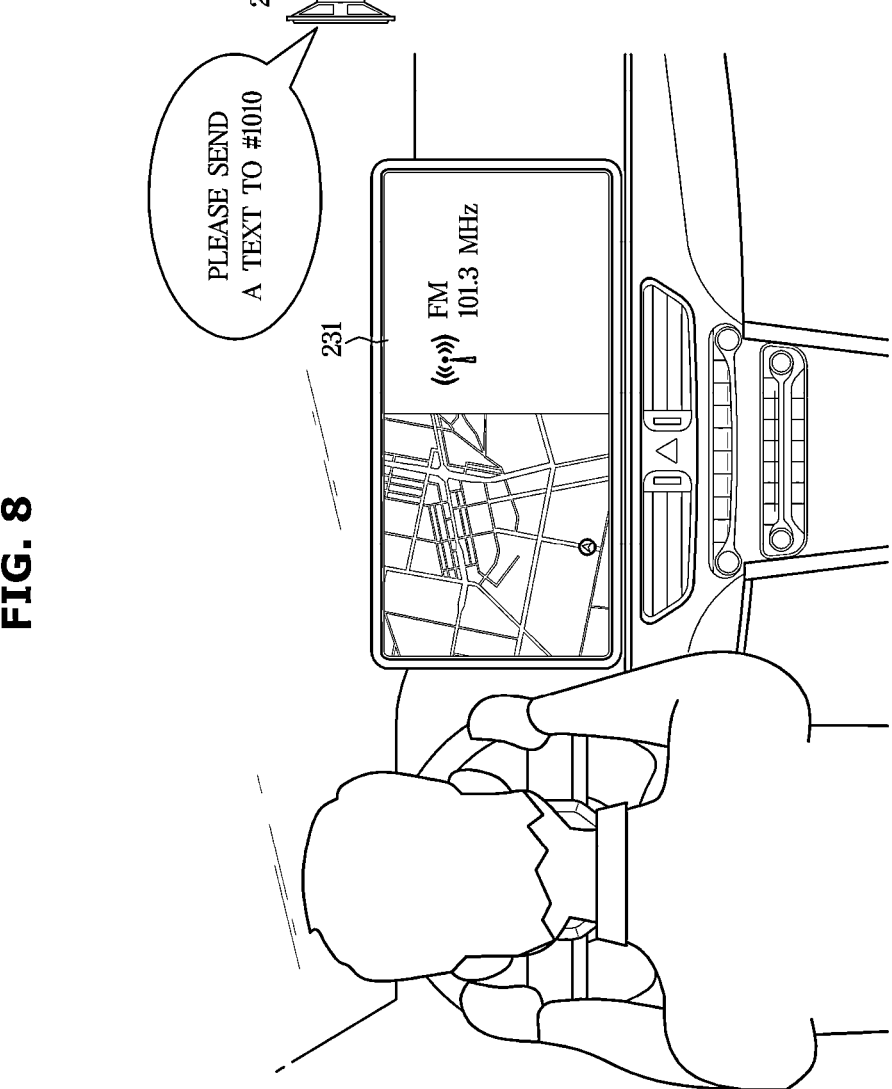
Figure 9:
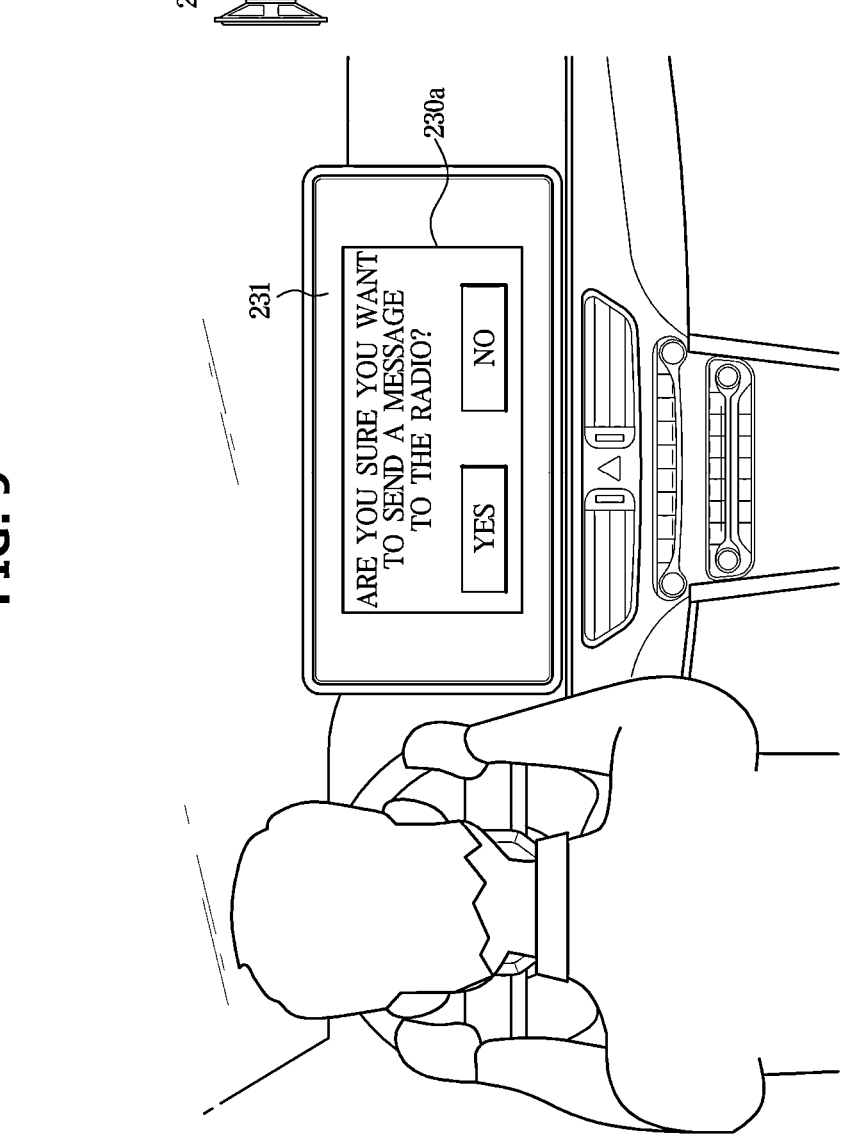
FIG. 9 is a diagram illustrating an example of a confirmation message output to confirm a user's intent in a method of controlling a vehicle, according to an embodiment.

FIG. 6 is a flowchart showing another example in which a predetermined condition for executing a message sending function is satisfied in a method for controlling a vehicle, according to an embodiment. FIGS. 7 and 8 are diagrams illustrating another situation in which a predetermined condition for executing a message sending function is satisfied in a method of controlling a vehicle, according to an embodiment. FIG. 9 is a diagram illustrating an example of a confirmation message output to confirm a user's intent in a method of controlling a vehicle, according to an embodiment.

Referring to FIG. 6, the radio broadcast output through the speaker 220 may be input to the microphone 210 (1310).

The microphone 210 in the vehicle 2 may operate in a manner that maintains an always-on state unless a user turns off the microphone 210, or may operate to be turned on when a user manipulates the input device 260, such as a Push to Talk (PTT) button, to input an on-command.

In a case in which the microphone 210 is not always on, the controller 250 may turn on the microphone 210 when a radio broadcast starts. Alternatively, the process shown in FIG. 6 may be performed only when a user turns on the microphone 210 by manipulating the input device 260.

The radio broadcast input to the microphone 210 may be processed by the speech processing module 10 of the speech recognition apparatus 100 (1320).

In an example, the speech processing module 10 may determine whether a predetermined keyword is included in the input radio broadcast. For example, a keyword, such as "text", "text participation", "#xxxx (x is an integer greater than or equal to 0)", and "send", which are related to message sending used to request or induce listeners to participate in text participation may be determined in advance.

As an example, the keywords may be converted into pronunciation strings by Graphe to Phoneme (G2P) technology and stored in the memory of the controller 250. The speech processing module 10 may compare a feature vector extracted from an audio signal corresponding to the input radio broadcast with a stored pronunciation string to determine whether a predetermined keyword is included in the radio broadcast.

For example, as shown in FIG. 7, when a sentence, such as "Please participate in a text message" is included in the radio broadcast output through the speaker 220, the speech processing module 10 may extract a predetermined keyword from the radio broadcast input to the microphone 210.

As another example, as shown in FIG. 8, even when a sentence such as "Please send a text to #1010" is included in the radio broadcast output through the speaker 220, the speech processing module 10 may extract a predetermined keyword from the radio broadcast input to the microphone 210.

When the predetermined keyword is included in the radio broadcast (YES in operation 1330), a confirmation message for confirming the user's intent to transmit a message may be output (1340).

As shown in FIG. 9, the controller 250 may visually output a confirmation message 230a, such as "Are you sure you want to send a message to the radio?", through the display 230 or may audibly output the confirmation message 230a through the speaker 220. In some embodiments, details of the confirmation message different from the above may also be utilized.

In the example of FIG. 9, the display 230 displaying the confirmation message is illustrated as an AVN display, but the confirmation message may also be displayed on a display provided in another area, such as a cluster display or a heads-up display.

When the user agrees to the message sending (YES in operation 1350), a user's speech message may be input as described above with reference to FIG. 4 (1400).

In some examples, the controller 250 may output a guide message for guiding the user to input a speech message. For example, when a predetermined condition is satisfied (YES in operation 1300), a guide message, such as "I will receive a message from now on", may be visually output through the display 230 or audibly output through the speaker 220. Alternatively, an input timing of the speech message may be guided by outputting a beep sound through the speaker 220.

Figure 10:
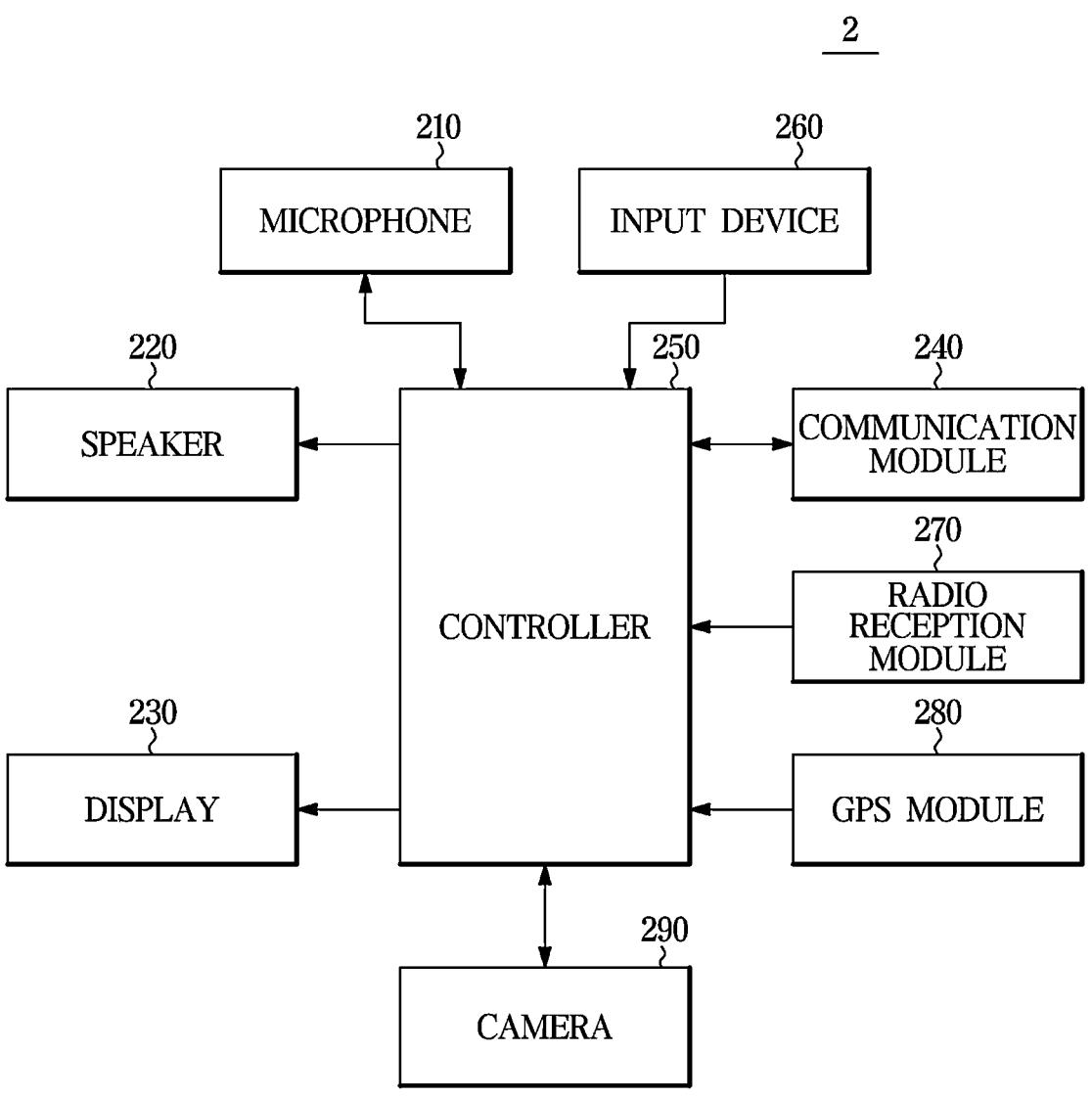
FIG. 10 is another block diagram illustrating a vehicle, according to another embodiment.
Figure 11:
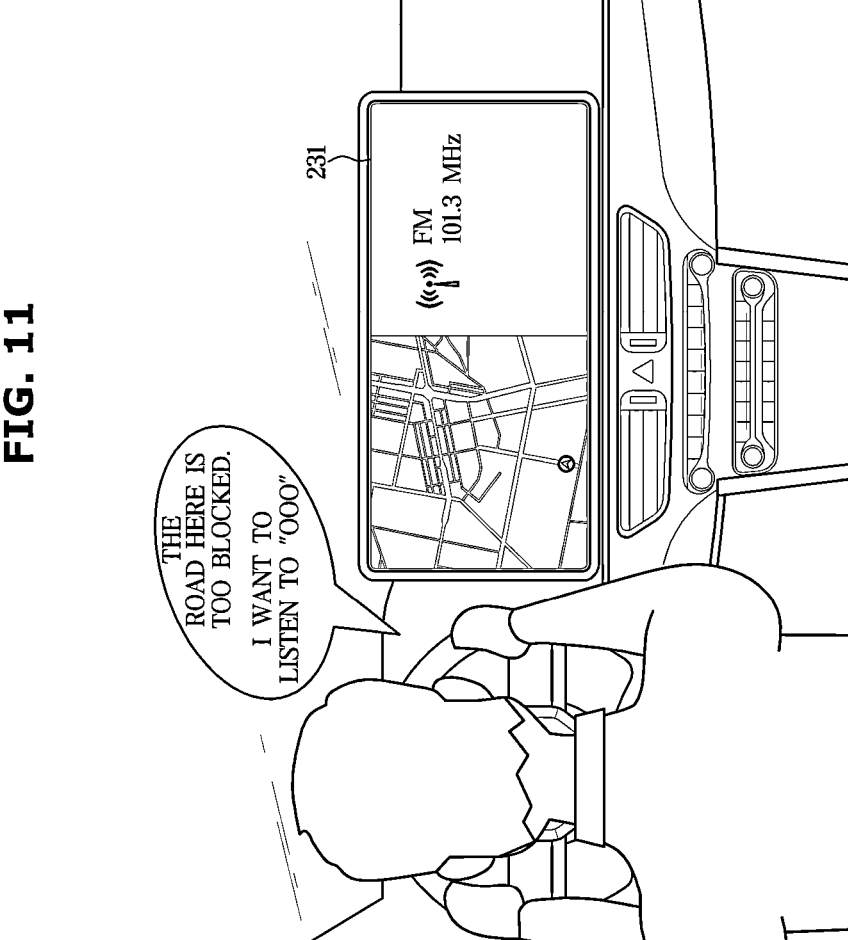
FIG. 11 is a diagram illustrating an example of a speech message input by a user in a vehicle and a method of controlling the same, according to an embodiment.
Figure 12:
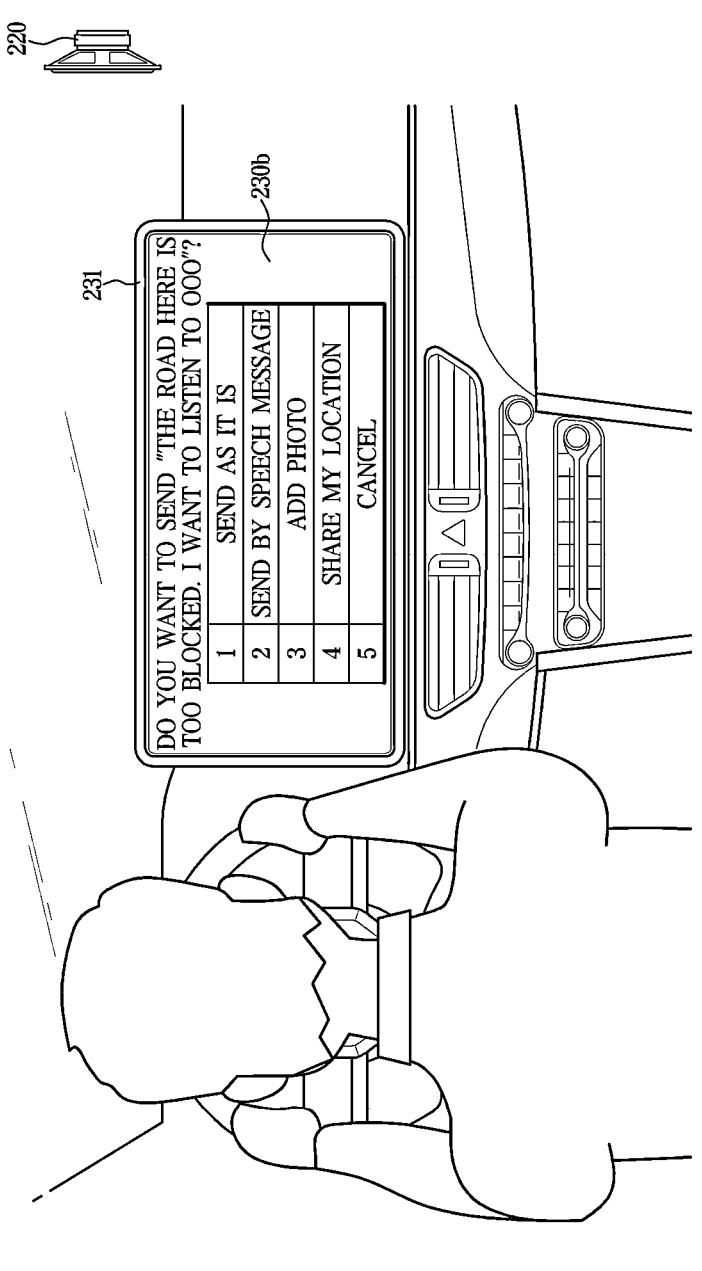
FIG. 12 is a diagram illustrating an example of a guide message for guiding a user option related to message sending in a vehicle and a method of controlling the same, according to an embodiment.

FIG. 10 is another block diagram illustrating a vehicle, according to another embodiment. FIG. 11 is a diagram illustrating an example of a speech message input by a user in a vehicle and a method of controlling the same, according to an embodiment. FIG. 12 is a diagram illustrating an example of a guide message for guiding a user option related to message sending in a vehicle and a method of controlling the same, according to an embodiment.

Referring to FIG. 10, the vehicle 2 according to an embodiment may further include a GPS module 280 for obtaining current location information, and a camera 290 for photographing an interior image or an exterior image of the vehicle 2.

The location information acquired by the GPS module 280 and the image captured by the camera 290 may be used for various purposes. For example, the location information and the image may be used to generate a message signal transmitted to the radio broadcasting station, or may be transmitted to the radio broadcasting station together with a message signal.

In order to transmit a message to a radio broadcast, a user may utter a speech message having desired content. For example, as shown in FIG. 11, the user may utter a speech message having content, such as "The road here is too blocked. I want to listen to "ooo"".

The speech message uttered by the user may be input to the microphone 210, and the speech message input to the microphone 210 may be processed by the speech processing module 10. The speech processing module 10 may perform speech recognition on the speech message to convert the speech message into text, and the controller 250 may generate a message signal based on the text converted from the speech message.

Alternatively, as shown in FIG. 12, various user options related to message sending may be provided. For example, text converted from a speech message may be transmitted as it is, and a speech message other than text may be transmitted. In an example, the speech message input by the user may be stored in the memory of the controller 250.

In some examples, an interior image or an exterior image of the vehicle 2 photographed by the camera 290 may also be transmitted together with the message signal, and the current location of the vehicle 2 may also be transmitted together with the message signal.

Referring to FIG. 12, the controller 250 may display a guide message 230b for guiding various user options on the display 230 as described above.

The guide message 230b may display text converted from a user's speech message, and may also display various selectable user options along with the text.

The user may check the guide message 230b and select a desired user option. The selection of the user option may be input through manipulation of the input device 260 or may be input through the microphone 210 as a speech command.

When the user selects an option for sending as it is, the controller 250 may send the message in the form of text.

Alternatively, when the user selects an option for sending by a speech message, the controller 250 may send the user's speech message stored in the memory.

Alternatively, when the user selects an option for adding a photo, the controller 250 may control the camera 290 to capture an interior image of the vehicle 2 or an exterior image of the vehicle 2, and transmit the captured image together with a message signal.

When the camera 290 is provided to capture both an interior image or exterior image of the vehicle 2, the camera 290 may photograph an interior image or an exterior image according to a user's selection.

For example, when the user desires to transmit his/her own image, the camera 290 may capture an image of the inside of the vehicle 2, and when the user desires to transmit an image indicating the current road condition or weather, the camera 290 may capture an image of the outside of the vehicle 2.

As another embodiment, an image to be captured may be selected based on a speech message input by the user. For example, when the speech message contains information about the current weather or road conditions, the controller 250 may, upon an option for adding a photo being selected by the user, control the camera 290 to capture an image of the outside of the vehicle 2 and transmit the captured image together with the message signal.

In an embodiment, the controller 250 may, upon an option for sharing the current location being selected by the user, transmit the location information obtained by the GPS module 280 together with the message signal.

In another embodiment, the controller 250 may, upon an option for sharing the current location being selected by the user, or upon a keyword indicating a location, such as "here" and "this place", being included in a user's speech message regardless of option selection, transmit the message signal in which the keyword is replaced with location information. In an example, the text may be corrected into "The road toward New York Time Square street is too blocked. I want to listen to ooo".

In an example, "ooo" in the speech message corresponds to the title of a song requested by the user. In an embodiment, the controller 250 may generate a message signal by automatically adding the singer's name even when the user utters only the title of the requested song without uttering the singer's name.

For example, when there is only one song with the corresponding title of the song, a message signal may be generated by adding the name of the corresponding singer, and when there are two or more songs with the corresponding title, the name of the singer intended by the user may be estimated based on a music playback history of the user.

The user's music playback history may be stored in the memory of the controller 250. In an embodiment, the controller 250 may estimate the name of the singer intended by the user based on the music playback history stored in the memory. Alternatively, the controller 250 may request information from an external content providing server used by the user.

For example, when the song "ooo" frequently listened to by the user is the song by the singer BTS, a message signal may be generated based on a sentence "The road here is too blocked. I wants to listen to BTS's ooo" and transmitted.

The generated message signal may be transmitted to a radio broadcasting station. In an example, a recipient number for the message signal may be a number introduced in a radio broadcast output through the speaker 220. The controller 250 may recognize a recipient number for message sending in the radio broadcast input into the microphone 210, and control the communication module 240 to transmit the message signal to the recognized number.

For example, when a sentence, such as "Send a text to #1010", is output during a radio broadcast, the controller 250 may control the communication module 240 to transmit a message using "#1010" as a recipient number.

When a user's mobile device is connected to the vehicle 2 through the communication module 240, the message signal may be transmitted using the number of the connected mobile device as a caller number.

When a user's mobile device is not connected to the vehicle 2 through the communication module 240, the message signal may be transmitted using a phone number registered in advance in the vehicle 2 as a caller number. When the user has not registered a phone number in advance, the user may be requested for a caller number.

Alternatively, when a user is logged in to a website corresponding to the radio broadcast signal, the message signal may be transmitted through the website. For example, when the user is logged in to the website of the radio broadcast through the infotainment system of the vehicle 2, the message signal may be transmitted using the logged-in ID.

In some embodiments, some of the operations of the controller 250 described herein may be performed by the controller 130 of the speech recognition apparatus 100. According to considerations, such as whether the speech recognition apparatus 100 is embedded in the vehicle 2 or the performance and capacity of the controller 250, some of the operations of the controller 250 may be designed to be performed by the controller 130. In some embodiments, the above-described operation of the controller 250 is performed at least partially by the speech recognition server 1.

In some examples, the method of processing a natural language, the method of generating grammars, and the dialogue system according to the disclosed embodiments may be stored in the form of instructions executable by a computer in a recording medium. The instructions may be stored in the form of program code and, when executed by a processor, may cause the processor to perform the operations of the disclosed embodiments. The recording medium may be embodied as a non-transitory recording medium.

The computer-readable recording medium includes all kinds of recording media in which instructions that may be decoded by a computer are stored, for example, a Read Only Memory (ROM), a Random-Access Memory (RAM), a magnetic tape, a magnetic disk, a flash memory, an optical data storage device, and the like.

As is apparent from the above, the vehicle and the method of controlling the same according to an aspect can, when a user having been listening to a radio broadcast in a vehicle desires to send a message to the radio broadcast, conveniently and safely send the message to the radio broadcast by uttering the message as speech.

Although embodiments of the present disclosure have been described for illustrative purposes, those having ordinary skill in the art should appreciate that various modifications, additions and substitutions are possible, without departing from the scope and spirit of the disclosure. Therefore, embodiments of the present disclosure have not been described for limiting purposes.

What is claimed is:

1. A vehicle comprising:
a microphone;
a display;
a communication module;
a radio reception module configured to receive a radio broadcast signal;
a speaker configured to output audio corresponding to the received radio broadcast signal; and
a controller configured to, based on a predetermined condition being satisfied while the audio corresponding to the radio broadcast signal is being output through the speaker, generate a message signal based on a speech message of a user input into the microphone, and control the communication module to transmit the generated message signal to a broadcasting station that broadcasts the radio broadcast signal,
the controller further configured to:
determine a keyword related to message sending based on the audio corresponding to the radio output through the speaker; and
transmit the generated message based on recognizing an intent of the speech message including message sending,
wherein the intent including the message sending is determined based on the keyword,
wherein the microphone is configured to receive the audio corresponding to the radio output through the speaker, and
wherein the predetermined condition is satisfied based on the audio input into the microphone including the keyword related to message sending.

2. The vehicle of claim 1, wherein the predetermined condition is satisfied when the intent corresponding to a speech command of the user input into the microphone includes message sending.

3. The vehicle of claim 1, further comprising:
a camera; and
a global positioning system (GPS) module,
wherein the controller is configured to control the communication module to transmit at least one of an image captured by the camera or location information obtained by the GPS module together with the message signal.

4. The vehicle of claim 3, wherein the controller is configured to, when the speech message of the user includes a keyword related to a current location, control the communication module to transmit the location information obtained by the GPS module together with the message signal.

5. The vehicle of claim 4, wherein the controller is configured to generate the message signal based on text converted from the speech message of the user input into the microphone.

6. The vehicle of claim 5, wherein the controller is configured to, when the text includes the keyword related to the current location, replace the keyword related to the current location with the location information obtained by the GPS module to generate the message signal.

7. The vehicle of claim 3, wherein the controller is configured to, when the speech message of the user includes a predetermined keyword, control the communication module to transmit the image acquired by the camera together with the message signal.

8. The vehicle of claim 1, wherein:
the microphone is configured to receive the audio output through the speaker, and
the controller is configured to:
recognize a recipient number for message sending in the audio input, corresponding to the received radio broadcast signal, into the microphone, and
control the communication module to transmit the message signal to the recognized recipient number.

9. The vehicle of claim 1, wherein the controller is configured to, when the user is logged in to a website corresponding to the radio broadcast signal, control the communication module for the message signal to be transmitted through the website.

10. A method of controlling a vehicle, the method comprising:
receiving a radio broadcast signal;
outputting audio corresponding to the received radio broadcast signal through a speaker;
upon a predetermined condition being satisfied while the audio corresponding to the radio broadcast signal is being output, generating a message signal based on a speech message of a user input into a microphone;
transmitting the generated message signal to a broadcasting station that broadcasts the radio broadcast signal;
determining a keyword related to message sending based on the audio corresponding to the radio output through the speaker; and
transmitting the generated message based on recognizing an intent of the speech message including message sending,
wherein the intent including the message sending is determined based on the keyword,
wherein the audio corresponding to the radio broadcast signal output through the speaker is input into the microphone, and
wherein the predetermined condition is satisfied when the audio input into the microphone includes the keyword related to message sending.

11. The method of claim 10, wherein the predetermined condition is satisfied when the intent corresponding to a speech command of the user input into the microphone includes message sending.

12. The method of claim 10, wherein transmitting the generated message signal includes transmitting at least one of an image captured by a camera or location information obtained by a global positioning system (GPS) module together with the message signal.

13. The method of claim 12, wherein transmitting the generated message signal includes, when the speech message of the user includes a keyword related to a current location, transmitting the location information obtained by the GPS module together with the message signal.

14. The method of claim 13, wherein generating the message signal includes generating the message signal based on text converted from the speech message of the user input into the microphone.

15. The method of claim 14, wherein generating the message signal includes, when the text includes the keyword related to the current location, replacing the keyword related to the current location with the location information obtained by the GPS module to generate the message signal.

16. The method of claim 12, wherein transmitting the generated message signal includes, when the speech message of the user includes a predetermined keyword, transmitting the image acquired by the camera together with the message signal.

17. The method of claim 10, wherein transmitting the generated message signal includes, when the microphone receives the audio corresponding to the radio broadcast signal output through the speaker, recognizing a recipient number for message sending in the audio input, corresponding to the received radio broadcast signal, into the microphone, and transmitting the message signal to the recipient number.

18. The method of claim 10, wherein transmitting the generated message signal includes, when the user is logged in to a website corresponding to the radio broadcast signal, transmitting the message signal through the website.

* * * * *